(12) United States Patent
Fouquer

(10) Patent No.: US 7,604,440 B2
(45) Date of Patent: Oct. 20, 2009

(54) CUTTING INSERT HAVING A LIMITED NUMBER OF FRAME FACES

(75) Inventor: Richard Fouquer, Saint-Cyr-sur-Loire (FR)

(73) Assignee: Safety Production, Boulogne Billancourt (FR)

( * ) Notice: Subject to any disclaimer, the term of this patent is extended or adjusted under 35 U.S.C. 154(b) by 0 days.

(21) Appl. No.: 10/590,580

(22) PCT Filed: Feb. 25, 2005

(86) PCT No.: PCT/FR2005/000454

§ 371 (c)(1),
(2), (4) Date: Oct. 23, 2006

(87) PCT Pub. No.: WO2005/089994

PCT Pub. Date: Sep. 29, 2005

(65) Prior Publication Data

US 2007/0217875 A1    Sep. 20, 2007

(30) Foreign Application Priority Data

Feb. 25, 2004    (FR) ................... 04 01877

(51) Int. Cl.
*B23C 5/22* (2006.01)
(52) U.S. Cl. ..................... 407/42; 407/113
(58) Field of Classification Search ........... 407/40, 407/42, 53, 60, 61, 113, 114, 116, 120; *B23C 5/22*
See application file for complete search history.

(56) References Cited

U.S. PATENT DOCUMENTS

| 5,810,519 | A |  | 9/1998 | Vogel et al. |
| 5,810,521 | A |  | 9/1998 | Pantzar et al. |
| 5,951,214 | A | * | 9/1999 | Rothballer et al. ............ 407/42 |
| 6,050,752 | A | * | 4/2000 | DeRoche .................... 407/114 |
| 6,604,893 | B2 | * | 8/2003 | Nelson ........................ 407/35 |
| 7,229,236 | B2 | * | 6/2007 | Craig ......................... 407/113 |
| 2007/0071561 | A1 | * | 3/2007 | Agic ........................... 407/34 |

FOREIGN PATENT DOCUMENTS

| EP |     432340 A1 | * | 6/1991 |
| EP |     548752 A1 | * | 6/1993 |
| EP | 1 366 840 A1 |   | 12/2003 |
| WO | WO 02/20206 A1 |  | 3/2002 |

OTHER PUBLICATIONS

International Search Report for PCT/FR2005/000454.

* cited by examiner

*Primary Examiner*—Sara Addisu
(74) *Attorney, Agent, or Firm*—Hirsch Simpson, LLC

(57) ABSTRACT

The cutting insert has a front layer (1A) provided with the lateral faces of a front circumference (3A, 4A, 5A, 6A) defining together with a large front face (1) a given number of cutting edges (13a, 13b; 14a, 14b; 15a, 15b; 16a, 16b). The cutting insert also has a rear layer (1B) provided with lateral faces of a rear circumference where at least certain faces are embodied in the form of faces supporting a frame (3B, 4B, 5B, 6B) on the walls of a toolholder housing (30), and wherein the number of the frame supporting faces (3B, 4B, 5B, 6B) is less than the number of cutting edges (13a, 13b; 14a, 14b; 15a, 15b; 16a, 16b).

17 Claims, 4 Drawing Sheets

CUTTING INSERT HAVING A LIMITED NUMBER OF FRAME FACES

CROSS-REFERENCE TO RELATED APPLICATIONS

This application claims the benefit of priority to International Patent Application PCT/FR2005/000454 filed on Feb. 25, 2005, which in turn claims priority to French patent application number 04 01877 filed on Feb. 25, 2004.

BACKGROUND OF THE INVENTION

1. Field of the Invention

This invention relates to the clamping of removable micro cutting inserts onto a tool holder, such as a drill, for example.

2. Description of Related Art

A removable cutting insert is conventionally pressed against the bottom of a seat of the tool holder by a clamping screw that freely passes through a centre hole of the cutting insert in order to become engaged with a tapped hole in the bottom of the seat. However, since the two engaged threads are provided with mutual allowance in order to facilitate screwing, this allowance leads to uncertainty in the framing of the cutting insert over this bottom. Furthermore, the machined part and the vibrations are likely to apply torque to the insert around the clamping screw. Such being the case, the clamping force of the screw is insufficient for exerting sufficient pressure to prevent any transverse displacement or any rotation relative to the clamping screw, taking into account the coefficient of friction between the insert and the bottom. For this reason, the seat has a planar lateral wall, and generally even two that are respectively longitudinal and axial in relation to a general axis of the tool holder, serving as a support to the corresponding planar, lateral faces of the insert, in order to form, together with the bottom, a trihedral for receiving a corner of the insert, which is thereby blocked from moving transversely and rotating.

In its entirety, therefore, the insert has two large parallel, rectangular anterior and posterior faces joined together by four planar lateral faces defining four rectilinear edges together with the large anterior face, two successive lateral faces serving as a framing support, the two other lateral faces being capable of providing this function if the insert is reversible. Quite obviously, the seat is open axially at the end and/or laterally in order to leave one of the above edges accessible as a cutting edge.

However, for certain applications, when viewed from above, the cutting edges must have an angular-shaped profile, i.e., one side of the conventional rectangle defining the large anterior face is then replaced by two successive, unaligned segments forming, for example, a lateral point, or, in other words, the cutting edge comprises a bevelled or cut-off end portion that is turned downward in the direction of the following edge. If the insert is reversible, the cutting edge of the opposite side thus has the same angular shape. Since this shape is determined by the intersection between the large anterior face and the respective lateral supporting face, then, in theory therefore, each of the lateral supporting faces must be provided in the form of two mutually inclined planar areas, when the insert is viewed from above. In short, the conventional rectangle delimiting the large anterior face is replaced by a hexagon, and this hexagonal shape is valid for all of the sections parallel to the large faces, i.e., for the framing support sides. This becomes an octagon if the large anterior face is delimited by four edges, all of them cutting, which, in fact, are each thereby divided into two cutting edges.

The one or two supporting walls provided in the seat must therefore be adapted to the new shape of the lateral faces, i.e., each must be divided into two mutually inclined planar portions, when the seat is viewed from above. For this reason, the periphery of the trihedral receiving the insert, which is initially defined by two perpendicular lateral walls representing half of the periphery of the insert, is now defined by four lateral surfaces that admittedly still represent half of this periphery, but that now delimit the periphery of the seat according to a less angular shape, i.e., with portions or facets having an overall rounded appearance. In summary, and in order to simply matters, assuming that all of the N peripheral angles are equal, each of them is equal to 180-360/N degrees.

For a high N number, this overall rounded shape results in the fact that the bearing forces of the lateral faces of the insert on the walls of the seat are exerted with increased obliquity when resisting the parasitic torque around the screw or any other clamping means. In other words, the seat and the insert have cooperating lateral framing surfaces that, in relation to the axis of the screw, have a radially extending surface component that is now reduced, i.e., a slight extension in a direction perpendicular to the circumferential force of the parasitic torque. For this reason, the lateral walls resist the bearing force of the insert poorly, which tends to slip therein due to an increased corner effect resulting from the aforesaid obliquity, i.e., with an increase in force.

When micro-inserts are involved, i.e., inserts of a few millimetres per side, the problem of positioning them accurately and holding them is more serious, because they are used to perform high-precision machining. In the above case involving supporting faces having several facets, it often occurs that the user places the insert in an incorrect angular position, because the overall rounded appearance of the framing walls around the periphery of the seat results in the fact that they tolerate a poor assembly. Thus the user may then carry out a screwing operation, with anticipated jamming, but this screwing operation has no reframing effect, resulting in imprecise machining of the part being machined and, furthermore, due to vibrations, the insert, which is not pressed completely against the bottom of the seat, may free itself from the screw, which is not completely tightened, and thereby damage the part being machined. The tool holder and the insert may also be damaged.

Conventionally, in order to resist the parasitic torque, grooves are cut on the lateral faces, which run in the direction of the thickness of the insert, so that the area closest to the large posterior face constitutes a fastening base forming a toothed wheel with which the walls of the seat mesh, via a corresponding fluted shape. Thus, this consists in replacing an insert periphery delimited by a series of uniform, planar or rounded lateral surface profiles with a periphery having the same shape overall but corrugated, i.e., not uniform, and thus longer, which therefore has an increased number of accordion-like facets thus having a more significant radial extension in relation to the clamping screw.

A solution such as this is not suitable, due to the above-mentioned risk of poor positioning.

SUMMARY OF THE INVENTION

This invention aims to propose a solution to this problem of positioning an insert in the seat.

For that purpose, the invention relates first of all to a reversible cutting insert comprising an anterior layer cutting head portion comprising mutually inclined lateral faces of an anterior periphery and delimiting, together with a large anterior face, a front view profile formed by a certain number of cutting edges mutually inclined in the direction of said profile, and a posterior layer portion, constituting an anchoring base on a tool holder, comprising lateral faces of a posterior periphery, at least some of which are framing supporting faces on walls of a seat of the tool holder, characterised in that the posterior periphery comprises a smaller number of lateral framing supporting faces than the number of cutting edges.

Thus, the proposed solution runs counter to the above solution of the prior art, since, in this case, a minimum number of lateral framing supporting faces are sought.

The lateral framing supporting faces may be planar or else may define a curved periphery, the curvature possibly being variable over the same lateral framing supporting face, the lateral framing supporting faces being concave or convex.

The successive lateral framing supporting faces may be joined together at respective angles less than 180 degrees, in order to thereby define a so-called posterior periphery having a uniformly varying orientation, i.e., the successive peripheral segments "wind round" so as to surround the periphery, while always veering off on the same side.

In one embodiment, the lateral framing supporting faces have an overall truncated cone shape.

For its part, the anterior layer portion may have a truncated pyramid shape having rising edges aligned with rising edges of the posterior layer portion.

In one particular embodiment, the anterior layer portion is delimited by two overlapping truncated pyramids having different tapers.

The large anterior face, in particular, may have an overall parallelogram shape, some of the consecutive pairs of lateral framing supporting faces, for example, being mutually inclined at an angle advantageously ranging between 65 and 85 degrees.

The invention also relates to a tool holder for a cutting insert according to the invention, the tool holder including a seat comprising a bottom, associated with insert clamping means, and lateral walls for receiving posterior framing support sides of the insert, characterised in that the seat is designed to receive and support a first specific number of posterior framing support sides of the insert and to leave accessible a second specific number, greater than the first number, of anterior cutting edges of the insert, determined by as many mutually inclined, anterior peripheral lateral faces as there are.

In some cases, the walls of the seat may be flared in relation to the bottom, so as to cooperate with oblique sides.

The walls of the seat are preferably mutually inclined at an angle α ranging from 65 to 85 degrees, in order that an insert of complementary shape might thus be tightly wedged therein to prevent any parasitic rotation.

The walls of the seat are further advantageously designed to also receive, as a framing support, anterior supporting sides of the anterior cutting edges of the insert.

BRIEF DESCRIPTION OF THE DRAWINGS

This invention will be better understood with the aid of the following description of an embodiment of a drill equipped with inserts according to the invention, with reference to the appended drawing in which.

DESCRIPTION OF THE PREFERRED EMBODIMENT(S)

Figure 1:
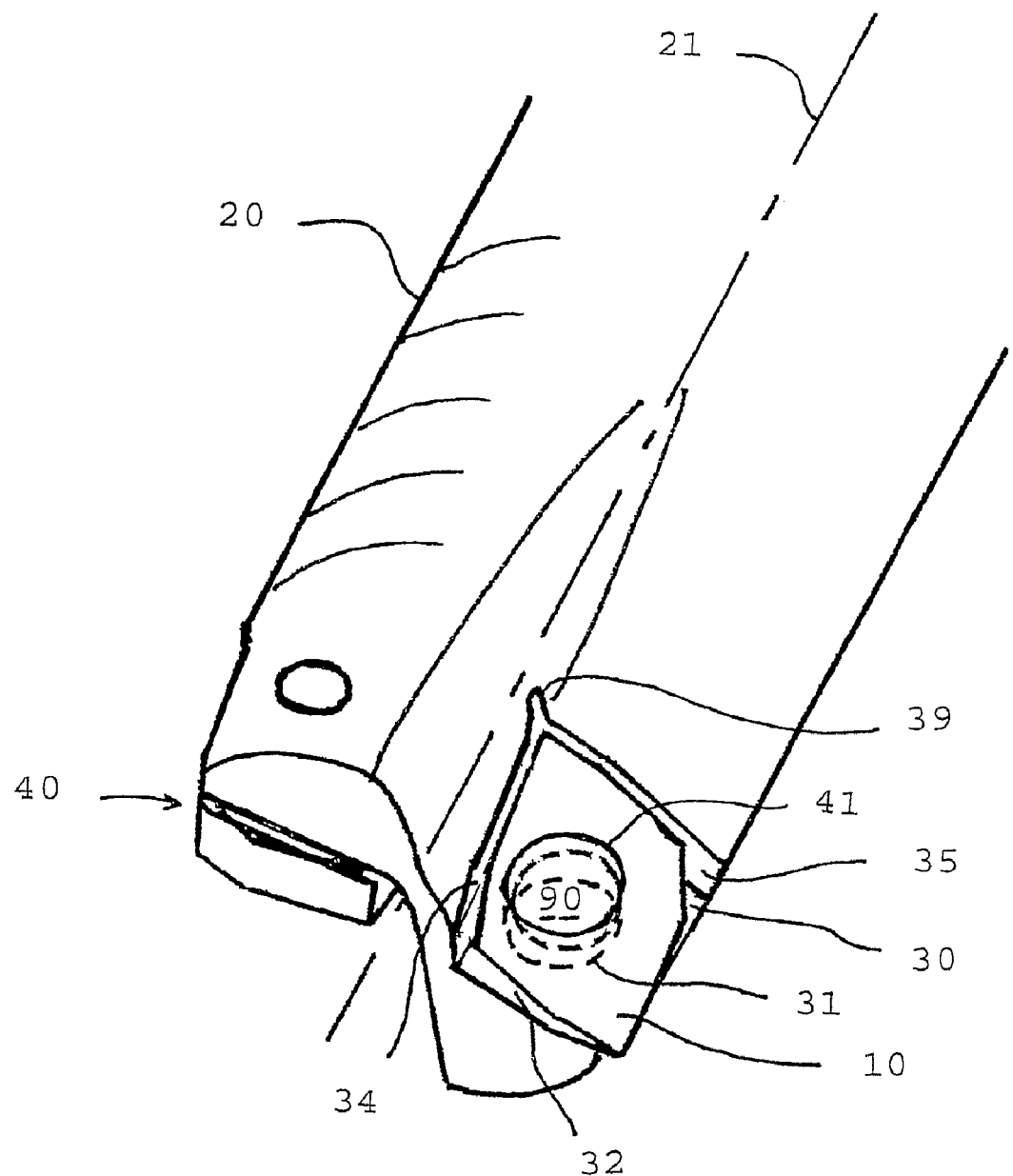
FIG. 1 is a perspective view of the drill holding two such diametrically opposed inserts, of which the anterior face of one is seen.

Here, the tool holder of FIG. 1 is a drill 20 with rotation axis 21, which shows very schematically, as seen from the front end in the drawing, four angular sectors of approximately 90 degrees each, two of these corresponding to two respective recesses resulting from slightly helical, axially extending flutes, so as to leave unobstructed two substantially identical and axially opposed seats 30, 40, provided in the two other sectors. The seat 30 comprises a bottom 32, extending in an axial plane parallel to a radial direction, but without, however, passing through the axis 21. The seat 30 thus forms a cavity with a bottom 32 that is downwardly oriented in relation to the radius representing the front end of one of the two surfaces delimiting the flute in question. This downward orientation, determining the depth of the seat 30, corresponds to a thickness value of a cutting insert 10.

The seat 30 is delimited by a longitudinal lateral wall 34, situated close to the axis 21, and by a very approximately radial, rear lateral wall 35. As a matter of fact, here, the insert 10 has a parallelogram-shaped cross section, with the result being that the rear lateral wall 35 has an outer radial edge that is more axially forward than a corner 39 connecting with the longitudinal wall 34, the corner 39 thus being close to the axis 21. In the same way, the seat 30 has slightly flared walls 34 and 35 each thus forming, together with the bottom 32, an angle slightly exceeding 90 degrees, because the insert 10 has a truncated pyramid shape.

Figure 2:
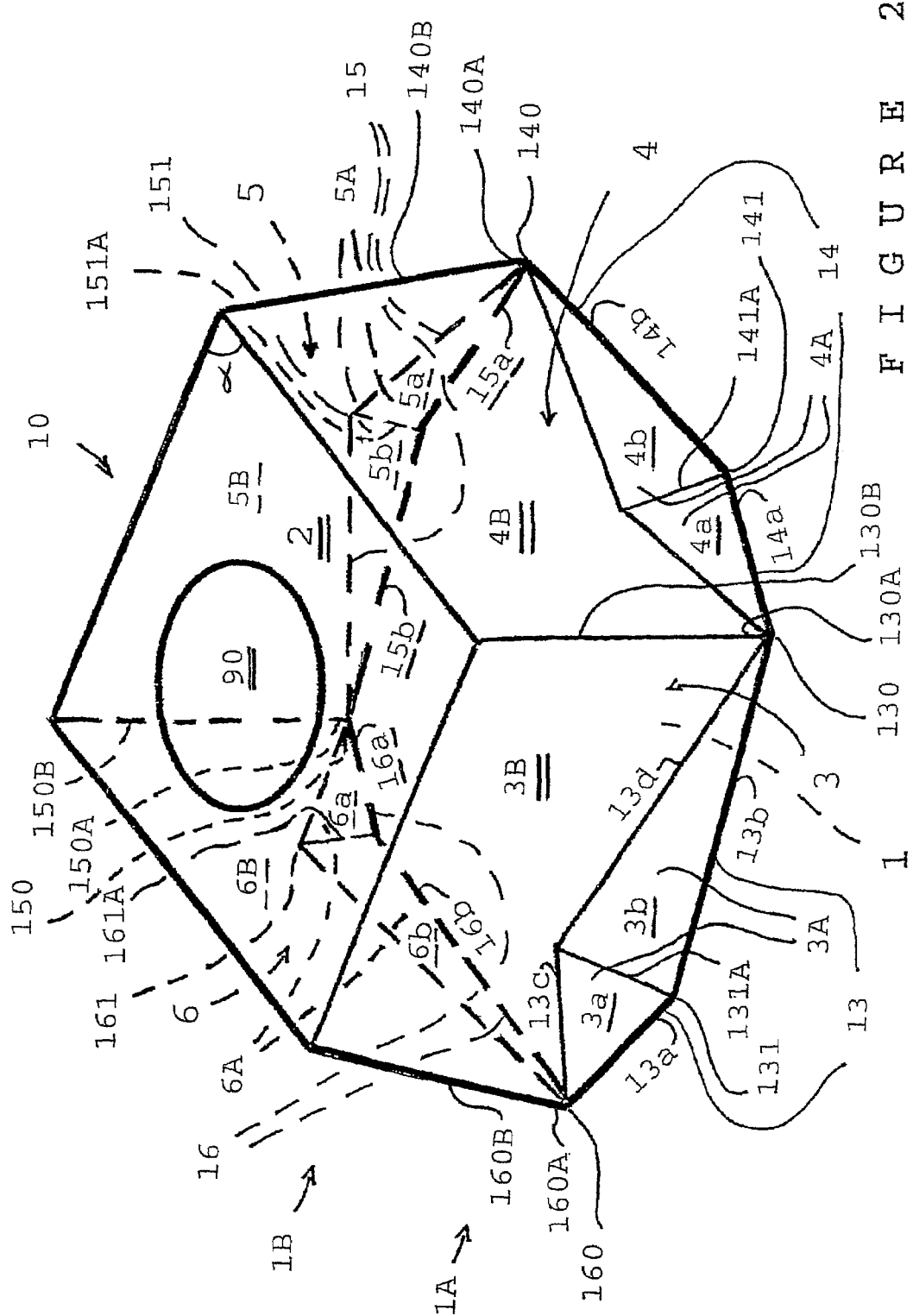
FIG. 2 is an oblique perspective view showing a posterior face and two lateral faces of one of the inserts, in inverted position.

As shown in FIGS. 1 and 2, the cutting insert 10 has an overall tile shape and, here, it specifically involves a micro-insert measuring a few millimetres per side having, in this example, an approximate distance of 5 mm between adjacent corners, referred to as main corners, like the plurality of four active corners here, referenced as 130, 140, 150, 160, i.e., at an angle closer to 90 degrees than to 180 degrees. The insert 10 comprises two main opposing faces that, in this case, are substantially planar and parallel, namely an active anterior face 1, with faceting or cutting edges, and a posterior face 2, which are joined together by a series of four lateral faces consisting of two opposing sides 3, 5 referred to, respectively, as front and rear, and also called transverse, or radial, and by two opposing longitudinal sides 4, 6, i.e., axial. The number of sides might be different in another example.

The posterior face 2 is a supporting face on the bottom 32 and the anterior face 1 is therefore flush with the top of the seat 30, i.e., it occupies a substantially radial position. However, as will be described later, since the insert 10 is symmetrical in relation to a specific geometric axis pointed in the direction of its thickness, two possible mounting positions exist, that differ from each other by 180 degrees, with the result being that the descriptive terms "front" and "rear" are valid only for these figures.

In this description, the extension axis 21 of the drill 20 constitutes a position and orientation reference for the insert 10, and the words "front" and "rear" are used here when reference is made to the position or orientation of an given element in relation to the axis 21. In addition, the insert 10 comprises a face turned in the instantaneous tangential direction of its rotary motion, namely the active face 1. So as to avoid any risk of confusion, the faces 1 and 2 are referred to respectively as "anterior" and "posterior", with respect to this tangential direction, and not "front" and "rear".

FIG. 1 shows that the insert 10 has a centre fastening hole 90 that passes through its thickness, determining the aforesaid geometric axis, a hole into which a clamping screw 41 passes freely, which cooperates with a tapped hole 31 provided in the bottom 32 of the seat 30. However, any other means of clamping may be provided an as alternative. In the clamping position, the respective longitudinal 4 and rear 5 sides of the insert 10 are supported by the respective walls 34 and 35 of the seat 30. For this reason, the insert 10 is also blocked from rotating on the bottom 32.

The profile of the anterior face 1, i.e., its front view contour along the axis of the fastening hole 90, a profile visible in FIG. 1 and more identifiable in FIG. 2, is not perfectly square or rectangular, however it has two distinctive features.

First of all, the anterior face 1, together with the four sides 3 to 6, substantially delimits four edges, all of which are cutting edges in this example, 13, 14, 15, 16, respectively, which are not rectilinear but, on the contrary, each forms a lateral raised contour portion, i.e., moving away from the centre hole 90 in a radial direction. In this example, each cutting edge 13 to 16 is thus formed by a pair of first and second successive segments 13*a* and 13*b*, 14*a* and 14*b*, 15*a* and 15*b*, 16*a* and 16*b*, each pair of such segments forming the two branches of a "V" open here at approximately 170 degrees. The first segments 13*a*, 14*a*, 15*a*, 16*a* are shorter here than the second segments 13*b*, 14*b*, 15*b*, 16*b*, and form a cut-off corner extension thereof, i.e., turned down slightly in the direction of the next segment.

Next, in this example, the distances between the overall extension directions of the two successive cutting edges 13, 14, 15, 16 are different by 90 degrees, by alternating around this value at each of the four main corners of the profile, 130, 140, 150 and 160, defined at the successive junctions of the cutting edges 13 to 16. In this way, the cutting edges 13 and 14 are overall mutually inclined at 105 degrees in this example, in the same way as the cutting edges 15 and 16. The opposing cutting edges being parallel overall, it follows that the cutting edges 14 and 15 delimit an angle of 75 degrees, just like the cutting edges 13 and 16. As stated above, this involves the angles between the overall extension directions of the cutting edges in question, whereas the angle formed by the two main corner segments in question 130, 140, 150 and 160 may be somewhat larger, due to the cut-off corner.

In FIG. 1, an acute angle of 75 degrees such as this is thus shown for the active corner 160, i.e., radially external to and axially forward from the seat 30, so as to be able to trace a groove in the machined material. However, other values may be selected for the above acute angle, depending on the particular application involved, a range of 65 to 85 degrees being considered as preferable.

In FIG. 2, the insert 10 is drawn in an inverted position, seen from the rear in order to better illustrate the lateral raised portions thereof. For hypothetical purposes, the insert 10 may be divided into two functional parts, namely a layer constituting an anterior portion 1A, for cutting or faceting a part being machined, and a layer 1B consisting of a posterior portion forming a fastening and framing base in the seat 30.

The anterior layer A1, delimited by the anterior face 1, has the above eight-sided profile when viewed from the front, i.e., the four pairs of segments 13*a* and 13*b*, 14*a* and 14*b*, 15*a* and 15*b*, as well as 16*a* and 16*b*.

However, in comparison with the eight sides, the posterior portion 1B has only a smaller number of lateral support and framing faces. Specifically, the posterior portion 1B has four such lateral faces 3B, 4B, 5B and 6B, i.e., a number that is equal to the number of front edges 13 to 16.

The posterior portion 1B has an approximate truncated cone shape, specifically a truncated pyramid with rising edges 130B, 140B, 150B and 160B, separating the successive posterior lateral side surfaces 3B, 4B, 5B and 6B, respectively, which are planar here and which belong to the respective sides 3, 4, 5, 6 and delimit the posterior portion 1B. The above angles of 75 and 105 degrees between the overall extension angles of the cutting edges 13 to 16 are also situated level with the periphery of the posterior face 2 and thus also level with any cut, and parallel thereto, of the lateral posterior edge surfaces 3B, 4B, 5B and 6B. However, the above-stated preferred angular range may be slightly modified by a different definition, which is more consistent with the definition of the angle of inclination between two surfaces, by assuming, for this purpose, a cutting plane that is exactly perpendicular to the two successive cut-off posterior lateral faces, such as 3B and 4B, i.e., a cutting plane that, by reason of the taper, is found to be slightly inclined in relation to the large faces 1 and 2.

In this example, the extensions of the posterior rising edges 130B, 140B, 150B and 160B pass through the anterior main corners 130, 140, 150, 160.

Due to the fact that, in the anterior face 1A, the segments 13*a* and 13*b*, 14*a* and 14*b*, 15*a* and 15*b*, as well as 16*a* and 16*b*, extend laterally outward in relation to the parallelogram defined by the four anterior main corners 130, 140, 150 and 160, it follows that, around the imaginary extension of the pyramidal shape of the posterior portion 1B, the anterior portion 1A has a bead or skirt of material supporting the aforesaid eight cutting segments.

The anterior portion 1A is substantially in the shape of an eight-sided truncated pyramid whose base is delimited by the four pairs of segments 13*a* and 13*b*, 14*a* and 14*b*, 15*a* and 15*b*, 16*a* and 16*b*, which rise up to four so-called main anterior rising edges 130A, 140A, 150A and 160B, which, in this case, are the extension of the posterior rising edges 130B, 140B, 150B and 160B, as stated above. Furthermore, four so-called secondary anterior edges 131A, 141A, 151A and 161A rise from four so-called secondary anterior corners 131, 141, 151, 161 defined by the point of the V of each pair of segments 13*a* and 13*b*, 14*a* and 14*b*, 15*a* and 15*b*, 16*a* and 16*b*. Four anterior side areas 3A, 4A, 5A and 6A are thereby delimited in the sides 3 to 6, each comprising two successive surfaces of different orientations, 3*a* and 3*b*, 4*a* and 4*b*, 5*a* and 5*b*, 6*a* and 6*b* situated, respectively, beneath the two segments in question. Each edge, e.g., such as the edge formed by the segments 13*a* and 13*b*, is thereby supported by two surfaces forming a nose, i.e., a sort of laterally extending cornice constituting a projection of the profile of the anterior face 1, as viewed from the front. Furthermore, the secondary edges, such as edge 131A for example, have, in this case, an extension limited to less than half, in this case approximately a third, of the thickness of the insert 10, with the result being that they extend at a relatively high angle, e.g., greater than 30 degrees and, in this case, approximately 45 degrees, in relation to the associated lateral face 3B or the like. The corresponding lateral face 3B may thus be set back further from a piece being machined, thus offering increased clearance space for the chips. As an alternative, provisions might be made for the noses such as 13a and 13b to have more than two such cutting edges, e.g., if the secondary anterior corner 131 were truncated.

The anterior secondary rising edges 131A, 141A, 151A and 161A thus define an angle of taper greater than that of the posterior portion 1B and thus also of the four anterior primary rising edges 130A, 140A, 150A and 160A. For this reason, the anterior portion 1A does not exactly have the shape of a truncated pyramid, but is formed by the joining together of two overlapping truncated pyramids having different tapers.

A detailed description will now be given, with reference to FIG. 3, of the shape of the front side 3, which consists of an anterior front lateral surface 3A, delimiting the anterior portion 1A, and of the posterior front lateral surface 3B, delimiting the posterior portion 1B, the explanation being applicable to the other three sides 4 to 6.

In this example, the anterior front lateral surface 3A, defining a bead portion, consists of the two, mutually inclined, successive anterior planar lateral surfaces 3a and 3b, delimited, respectively, by the cutting edges 13a and 13b and separated by the anterior secondary rising edge 131. The trihedral thus formed forms a lateral cutting nose. The sides 4 to 6 also have the homologous pairs of cutting segments 14a and 14b, 15a and 15b, as well as 16a and 16b.

Thus, starting with the segments 13a and 13b, the anterior lateral surfaces 3a and 3b intersect with the posterior lateral surface 3B along two respective straight lines 13c and 13d in the form of a V open towards the anterior face 1. Thus, in this example, the anterior portion 1A has a variable thickness and, in particular, nil at the anterior main corners 130, 140, 150, 160, where the bead disappears locally. Over the thickness of the entire periphery of the anterior large face 1, the bead thus forms four scallops, each in the shape of a nose having a lateral outward extension and a thickness that are at their maximum at the nose tip secondary corners 131, 141, 151 and 161, and a minimum thickness, in this case nil, at the main corners 130, 140, 150 and 160, where they join together. The standard thickness of the four noses over the entire periphery defines a functional thickness for the anterior portion 1A and, as opposed to the constant total thickness of the insert 10, defines a functional thickness for the posterior portion 1B.

In another example, provisions may be made such that the anterior main corners 130, 140, 150 and 160 do not constitute the extension of the rising edges of the posterior portion pyramid 1B, i.e., the anterior main rising edges 130A, 140A, 150A and 160A have a taper separate from that of the posterior portion 1B, e.g., equal to that of the anterior secondary rising edges 131A, 141A, 151A and 161A, in order to actually define a truncated pyramid, or else different so that the bead offers optimum support over the entire length of the eight segments 13a and 13b, 14a and 14b, 15a and 15b, 16a and 16b, while at the same time having a desired relief angle. In such cases, the minimum thickness of the bead at the main corners 130, 140, 150 and 160 is not nil. As an alternative still, the posterior layer portion 1B might form a base having a constant thickness, i.e., the outwardly extending V would no longer form a trihedral, but would retain its shape over the entire thickness of the anterior portion 1A.

The radial rear lateral wall 35 of the seat 30 has a shape, planar in this case, which is designed to equally receive and support both the posterior front lateral surface 3B as well as a homologous posterior rear lateral surface of the same shape, belonging to the rear side 5, which is the case in FIG. 1. In the same way, the longitudinal lateral wall 34 has the same type of shape, designed to cooperate with any one of the posterior portions 4B and 6B of the sides 4 and 6. Thus, the walls 34 and 35 extend in a rectilinear, substantially axial and approximately radial direction to the posterior pyramid's two posterior support and framing sides 4B and 5B or 6B and 3B under consideration.

For this reason, a posterior rising edge coming from the main corner 140, homologous to the posterior rising edge 160B coming from the main corner 160, constitutes a sort of tooth having a significant radial extension in relation to the axis of the fastening hole 90, and it thereby offers a surface that is less inclined in relation to a radius of the axis of the hole 90, which would not be so in the case of a tooth defined by two surfaces mutually inclined at 90 degrees. The two posterior sides under consideration then, 4B and 5B or 6B and 3B, thus each exhibit a substantially circumferential force in reaction to parasitic torque forces in one direction or the other, which limits the corner effect mentioned at the very beginning.

Figure 3:
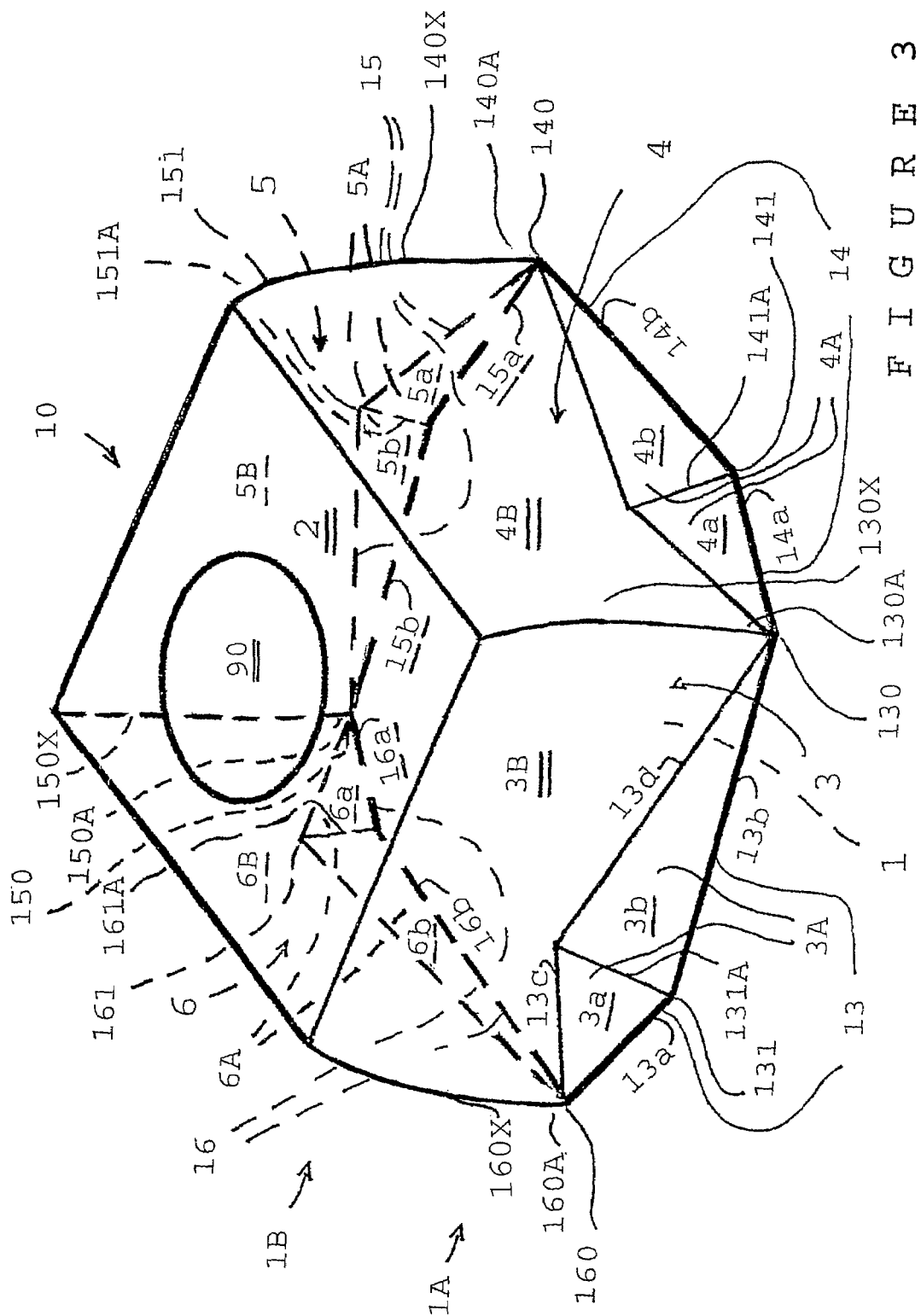
FIG. 3 is an oblique perspective view of another embodiment of the present invention showing an exemplary configuration having a posterior face and two lateral faces of an insert having curved lateral faces defining a curved posterior periphery, in an inverted position.
Figure 4:
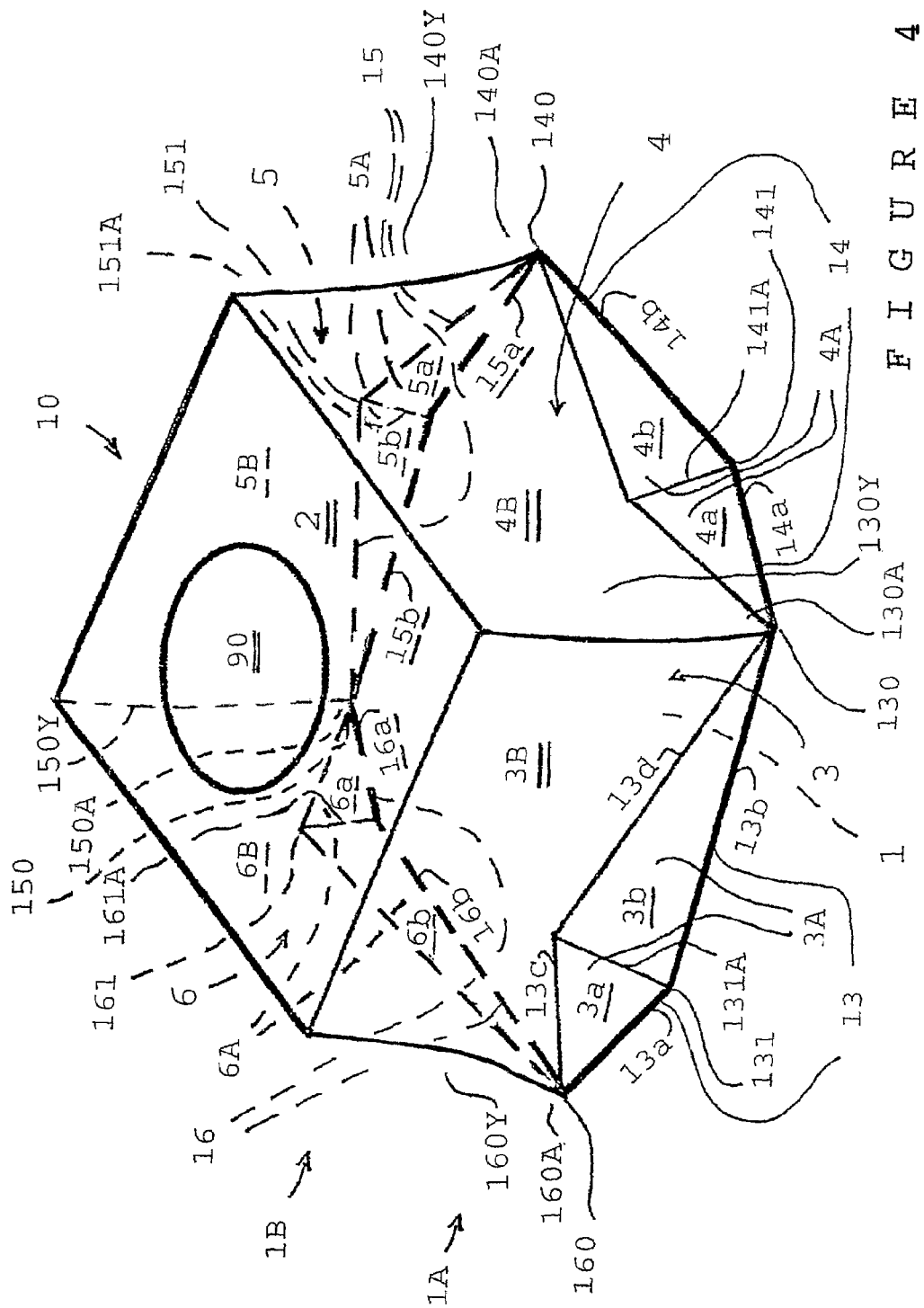
FIG. 4 is an oblique perspective view of yet another embodiment of the present invention showing an exemplary configuration having a posterior face and two lateral faces of an insert having concave curved lateral faces and a curvature that is variable, in an inverted position.

FIG. 3 is an oblique perspective view of an embodiment similar to that of FIG. 2 but wherein the lateral support faces 3B, 4B, 5B, 6B are shown having curved lateral faces defining a curved posterior periphery as seen in the edges 130X, 140X, 150X, 160X. FIG. 4 is an oblique perspective view of another embodiment similar to that of FIG. 2 but wherein the lateral support faces 3B, 4B, 5B, 6B are shown having concave curved lateral faces defining a curved posterior periphery as seen in the edges 130Y, 140Y, 150Y, 160Y. Additionally, the concave curved lateral faces can be seen having a curvature that is variable.

Furthermore, the walls 34 and 35, as shown in FIG. 1, may also be provided such that, at the top part of the seat 30, each one comprises an area having a re-entrant V-shaped cavity, so as to provide an additional bearing force via cooperation with the anterior side areas 4A and 5A or 6A and 3A, even if this addition is less effective than for the posterior portion 1B with rectilinear sides.

The invention claimed is:

1. An indexable cutting insert, comprising an anterior layer cutting head portion and a posterior layer portion, wherin:
   the anterior layer cutting head portion comprises:
      an anterior face, and
      mutually inclined lateral faces extending transversally to the anterior face and joining each anterior face, wherein the mutually inclined lateral faces delimit together with the anterior face, a front view profile formed by a certain number of cutting edges mutually inclined in the direction of said profile, the mutually inclined lateral faces joining the anterior face at the cutting edges and the cutting edges being located substantially in a same plane,
   the posterior layer portion constitutes an anchoring base for anchoring the indexable cutting insert on a tool holder, the posterior layer portion comprising:
      a posterior face for supporting the indexable cutting insert on a bottom of a seat of the tool holder; and
      lateral framing supporting faces for supporting the indexable cutting insert on walls of the seat of the tool holder, the lateral framing supporting faces extending transversally to the posterior face and joining each the posterior face;
   the number of said lateral framing supporting faces is smaller than the number of cutting edges; and
   the cutting edges define cutting noses, each cutting nose protruding with respect to a respective one of the lateral framing supporting faces.

2. The insert according to claim 1, in which the lateral framing supporting faces are planar.

3. The insert according to claim 1, in which the lateral framing supporting faces define a curved posterior periphery.

4. The insert according to claim 3, in which the curvature is variable over a same lateral framing supporting face.

5. The insert according to claim 1, in which successive lateral framing supporting faces are joined together at respective angles less than 180 degrees, in order to thereby define a said posterior periphery having a uniformly varying orientation.

6. The insert according to claim 3, in which the lateral framing supporting faces are concave.

7. The insert according to claim 1, in which the posterior layer has the shape of a truncated pyramid that tapers toward the posterior face.

8. The insert according to claim 7, in which the truncated pyramid has rising edges extending up to the anterior face of the anterior layer cutting head portion.

9. The insert according to claim 1, in which some of consecutive pairs of lateral framing supporting faces are mutually inclined at an angle ranging between 65 and 85 degrees.

10. The insert according to claim 1, wherein the posterior face is substantially planar and parallel to the cutting edges.

11. An indexable cutting insert, comprising an anterior layer cutting head portion and a posterior layer portion, wherein:
the anterior layer cutting head portion comprises:
an anterior face, and
mutually inclined lateral faces extending transversally to the anterior face and joining each anterior face,
wherein the mutually inclined lateral faces delimit, together with the anterior face, a front view profile formed by a certain number of cutting edges mutually inclined in the direction of said profile, the mutually inclined lateral faces joining the anterior face at the cutting edges and the cutting edges being located substantially in a same plane,
the posterior layer portion constitutes an anchoring base for anchoring the indexable cutting insert on a tool holder, the posterior layer portion comprising:
a substantially planar posterior face for supporting the indexable cutting insert on a bottom of a seat of the tool holder, the posterior face being delimited by four edges; and
four lateral framing supporting faces for supporting the indexable cutting
insert on walls of the seat of the tool holder, each of the four lateral framing supporting faces being substantially planar and each of the four lateral framing supporting faces extending transversally to the posterior face and joining a respective one of the four edges delimiting the posterior face;
the number of cutting edges is greater than four, and
the cutting edges define cutting noses, each cutting nose protruding with respect to a respective one of the four lateral framing supporting faces.

12. The insert according to claim 11, wherein the anterior layer cutting head portion comprises eight mutually inclined lateral faces joining each anterior face, the eight mutually inclined lateral faces delimiting, together with the anterior face, a front view profile formed by eight cutting edges mutually inclined in the direction of said profile, the eight cutting edges defining four cutting noses protruding each with respect to a respective one of the four lateral framing supporting faces of the posterior layer portion.

13. The insert according to claim 12, in which the posterior layer cutting has a shape of a truncated pyramid with rising edges extending up to the anterior face of the anterior layer cutting head portion, the truncated pyramid tapering towards the posterior face of the posterior layer.

14. Assembly, comprising:
a tool holder having a longitudinal axis,
at least one indexable cutting insert, comprising an anterior layer cutting head portion and a posterior layer portion, wherein:
the anterior layer cutting head portion comprises:
an anterior face, and
mutually inclined lateral faces extending transversally to the anterior face and joining each anterior face,
wherein the mutually inclined lateral faces delimit, together with the anterior face, a front view profile formed by a certain number of cutting edges mutually inclined in the direction of said profile, the mutually inclined lateral faces joining the anterior face at the cutting edges and the cutting edges being located substantially in a same plane,
the posterior layer portion constitutes an anchoring base by which the indexable cutting insert is anchored on the tool holder, the posterior layer portion comprising:
a posterior face by which the indexable cutting insert is supported on a bottom of a seat of the tool holder, and
lateral framing supporting faces extending transversally to the posterior face and joining each posterior face, the indexable cutting insert being supported on walls of the seat of the tool holder by some of the lateral framing supporting faces,
the number of said lateral framing supporting faces is smaller than the number of cutting edges, and
the cutting edges define cutting noses, each cutting nose protruding with respect to a respective one of the lateral framing supporting faces, and
insert clamping means which are associated to the bottom of the seat of the tool holder, the indexable cutting insert being clamped on the tool holder by the insert clamping means, wherein one of said cutting noses protrudes axially from the tool holder.

15. Assembly according claim 14, wherein said walls of the seat of the tool holder are also in contact with inclined lateral faces of the anterior layer insert.

16. Assembly according claim 14, wherein:
the number of said lateral framing supporting faces of the posterior layer portion is four, each of said lateral framing supporting faces being substantially planar,
the posterior face is substantially planar and parallel to the cutting edges,
the indexable cutting insert is supported on two walls of the seat of the tool holder by two adjacent lateral framing supporting faces, and
the anterior layer cutting head portion comprises eight mutually inclined lateral faces joining each anterior face, the eight mutually inclined lateral faces delimiting, together with the anterior face, a front view profile formed by eight cutting edges mutually inclined in the direction of said profile, the eight cutting edges defining four cutting noses protruding each with respect to a respective one of the four lateral framing supporting faces of the posterior layer portion.

17. Assembly according to claim 16, wherein the tool holder holds two indexable cutting inserts diametrically opposed with respect to the longitudinal axis.

* * * * *